(12) United States Patent
Ravuri et al.

(10) Patent No.: US 11,576,190 B2
(45) Date of Patent: Feb. 7, 2023

(54) SYSTEMS AND METHODS FOR APPLICATION AWARE SLICING IN 5G LAYER 2 AND LAYER 1 USING FINE GRAIN SCHEDULING

(71) Applicant: EdgeQ, Inc., Santa Clara, CA (US)

(72) Inventors: Vinay Ravuri, Cupertino, CA (US); Sriram Rajagopal, Karnataka (IN)

(73) Assignee: EdgeQ, Inc., Santa Clara, CA (US)

( * ) Notice: Subject to any disclaimer, the term of this patent is extended or adjusted under 35 U.S.C. 154(b) by 41 days.

(21) Appl. No.: 17/366,677

(22) Filed: Jul. 2, 2021

(65) Prior Publication Data
US 2023/0007664 A1 Jan. 5, 2023

(51) Int. Cl.
*H04W 72/12* (2009.01)
(52) U.S. Cl.
CPC .................................. *H04W 72/12* (2013.01)
(58) Field of Classification Search
CPC ..................................................... H04W 72/12
USPC .......................................................... 370/329
See application file for complete search history.

(56) References Cited

U.S. PATENT DOCUMENTS

| 2003/0095538 A1 | 5/2003 | Kayama et al. |
| 2018/0324635 A1 | 11/2018 | Babaei et al. |
| 2021/0135733 A1 | 5/2021 | Huang et al. |

OTHER PUBLICATIONS

International Search Report and Written Opinion of the International Searching Authority dated Aug. 18, 2022 in related PCT application No. PCT/US22/29069, (14 pgs).

*Primary Examiner* — Angel T Brockman
(74) *Attorney, Agent, or Firm* — North Weber & Baugh LLP; Michael North

(57) ABSTRACT

Advances in wireless technologies have resulted in the ability of a 5G communication system to support multiple wireless communication applications. Each of these applications requires special handling in all layers and more so in scheduler and physical layer. The present disclosure presents embodiments of dynamical creating a computation instance with a slice of resources allocated for each scheduling input. Each computation instance may be independently managed, controlled, and customized according to the specific requirements of the corresponding scheduling input. Such a dynamic resource allocation allows large number of slices in PHY layer. Furthermore, when overloading happens, one scheduling inputs may be migrated from one distribution unit (DU) to another DU without interruption for end users during scheduling migration. Accordingly, efficiency and robustness of a 5G communication system may be improved to serve multiple wireless communication applications.

20 Claims, 8 Drawing Sheets

SYSTEMS AND METHODS FOR APPLICATION AWARE SLICING IN 5G LAYER 2 AND LAYER 1 USING FINE GRAIN SCHEDULING

TECHNICAL FIELD

The present disclosure relates generally to a unified wireless architecture that manages multiple wireless communication applications and data processing associated therewith. More particularly, the present disclosure relates to a processing architecture that manages multiple wireless communication applications in 5G layer 2 and layer 1 using fine grain scheduling.

BACKGROUND

The importance of wireless communication in today's society is well understood by one of skill in the art. Advances in wireless technologies have resulted in the ability of a 5G communication system to support multiple types of wireless communication applications, e.g., drones, Ultra-Reliable Low-Latency Communication (URLLC), Internet of things (IoT) devices, enhanced Mobile Broadband (eMBB), etc. Each type of communication applications may have their own requirements or preferences in layer 2 (scheduler and Medium Access Control (MAC)) and layer 1 (physical layer or PHY).

Having a same design for all these applications may be inefficient for overall system performance and operation. While on the other hand, different hardware solutions for at least PHY acceleration and separate/different layer 2 schedulers may be used for different types of applications. However, such an implementation with multiple specific designs means multiple variants of products or solutions, and thus increases cost and complexity. The deployment of such a solution is also difficult.

Accordingly, what is needed are systems, devices and methods that address the above-described issues.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
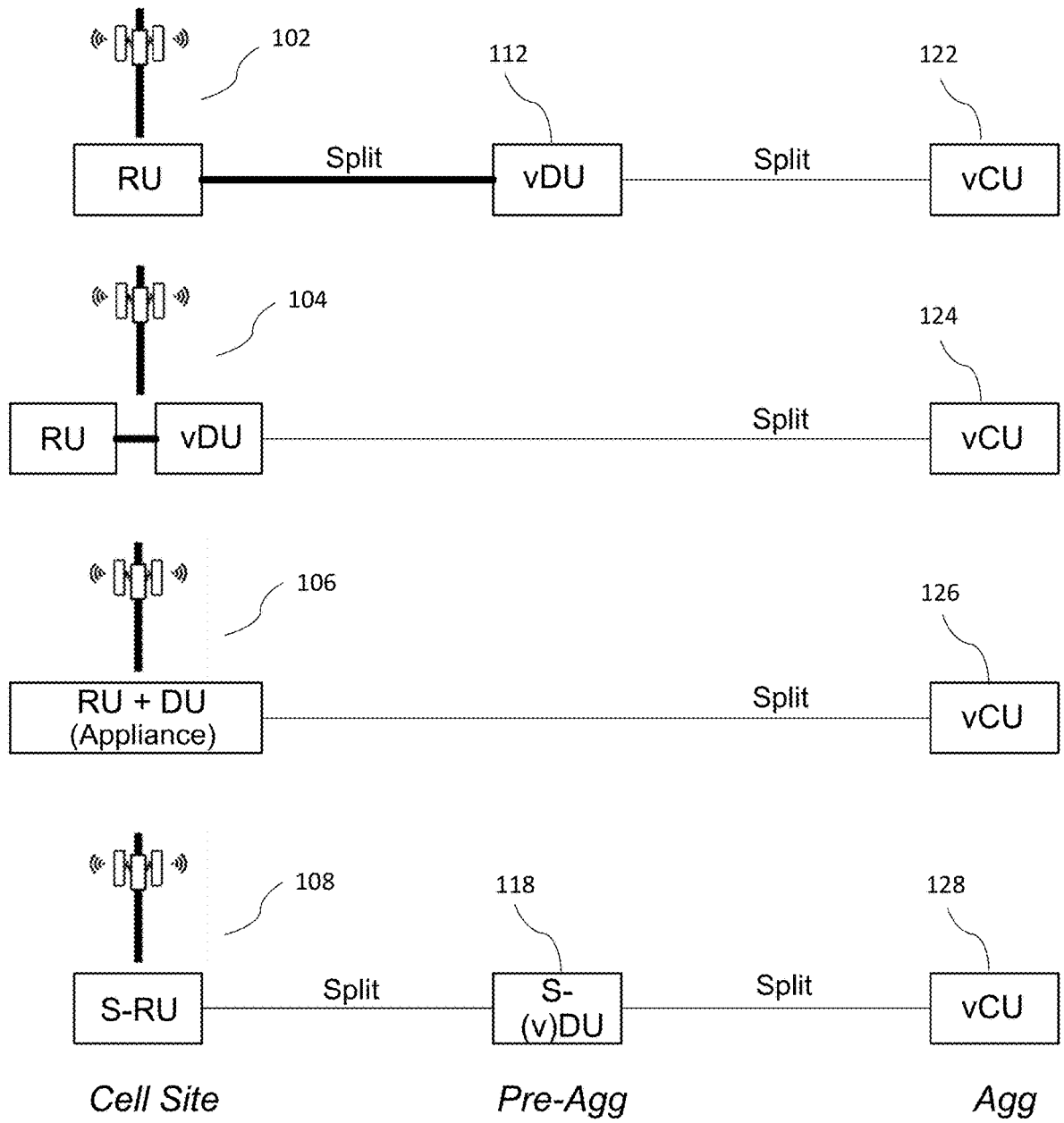
FIG. 1 ("FIG. 1") depicts various open radio access network (RAN) deployments for a telecommunication service provider, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Open RAN Deployment Models

A radio access network (RAN) is part of a telecommunication system. It implements a radio access technology (RAT) to provide connection between a device, e.g., a mobile phone, and a core network (CN). Open RAN is an approach based on interoperability and standardization of RAN elements including a unified interconnection standard for white-box hardware and open source software elements from different vendors.

FIG. 1 depicts various open radio access network (RAN) deployments for a telecommunication service provider, according to embodiments of the present disclosure. As shown in FIG. 1, a radio unit (RU) 102 may couple to a virtual distribution unit (vDU) 112 with a split, e.g., ORAN 7-2 split, which is a Low PHY/High PHY split for ultra-reliable low-latency communication (URLLC) and near-edge deployment. The vDU 112 then couples to a virtual central unit (vCU) 122 with a split, e.g., split 2, which is referred as radio resource control and packet data convergence control split from the Layer 2 radio link control (RLC). Alternatively, a vDU may be deployed on the side of an RU 104, and then couples to a vCU 124 with a split, e.g., split 2. Alternatively, a distribution unit (DU) and an RU may be integrated as an appliance 106, which then couples to a vCU 126 with a split, e.g., split 2. Alternatively, a RU may be a small cell RN (S-RU) 108 couples to a small cell DU or vDU (S-vDU) 118 using a split, e.g., a MAC/PHY layer split (split 6). The S-vDU 118 then couple to a vCU 128 with a split, e.g., split 2.

A service provider (SP) may adopt more than one Open RAN deployment models based on band, fronthaul bandwidth requirements, or deployment type (macro/small cell), etc. Deployment models are influenced or decided based on multiple factors, including Fibre availability, real-estate/site/location constraints at pre-aggregation (Pre-Agg) and cell sites, total cost of ownership (TCO), Operational preference, etc. It is desirable for SPs to achieve maximum consistency around architecture, systems and operational model across all these deployment models.

B. Resource Allocation Across Multiple Wireless Scheduling Inputs

In a dis-aggregated open and virtualized RAN architecture, multiple carriers may be converged in a DU which implements, among other operations, layer-2 scheduler and some higher operations on the physical layer.

Operations of components on the physical layer may be critically different for various applications. For example, a scheduler may be implemented to optimize retransmissions for data traffic, or to optimize semi-persistent allocations for voice or low latency applications. In another example, some applications may involve higher density of pilots/reference signals for fast moving users, e.g., drones. There are many such optimizations being served within a coverage region. In one or more embodiments of the present patent document, the different types of applications are considered as scheduling inputs as each of them use a slice of the resource (or at least resources on the physical layer and the layer-2 scheduler) for a specific application type.

In certain situations, various carriers may be aggregated at a DU, which results in multiple slices aggregating for the physical layer implementations. Resources required for each of the application is a slice of the overall resources, e.g., compute capability. Reserving excessive resources for a slice of the spectrum or resource is not only wasteful, but also lowers overall system operation efficiency and performance. The present patent document discloses embodiments of managing multiple slices actively and/or optimally across multiple applications in single hardware architecture.

Figure 2:
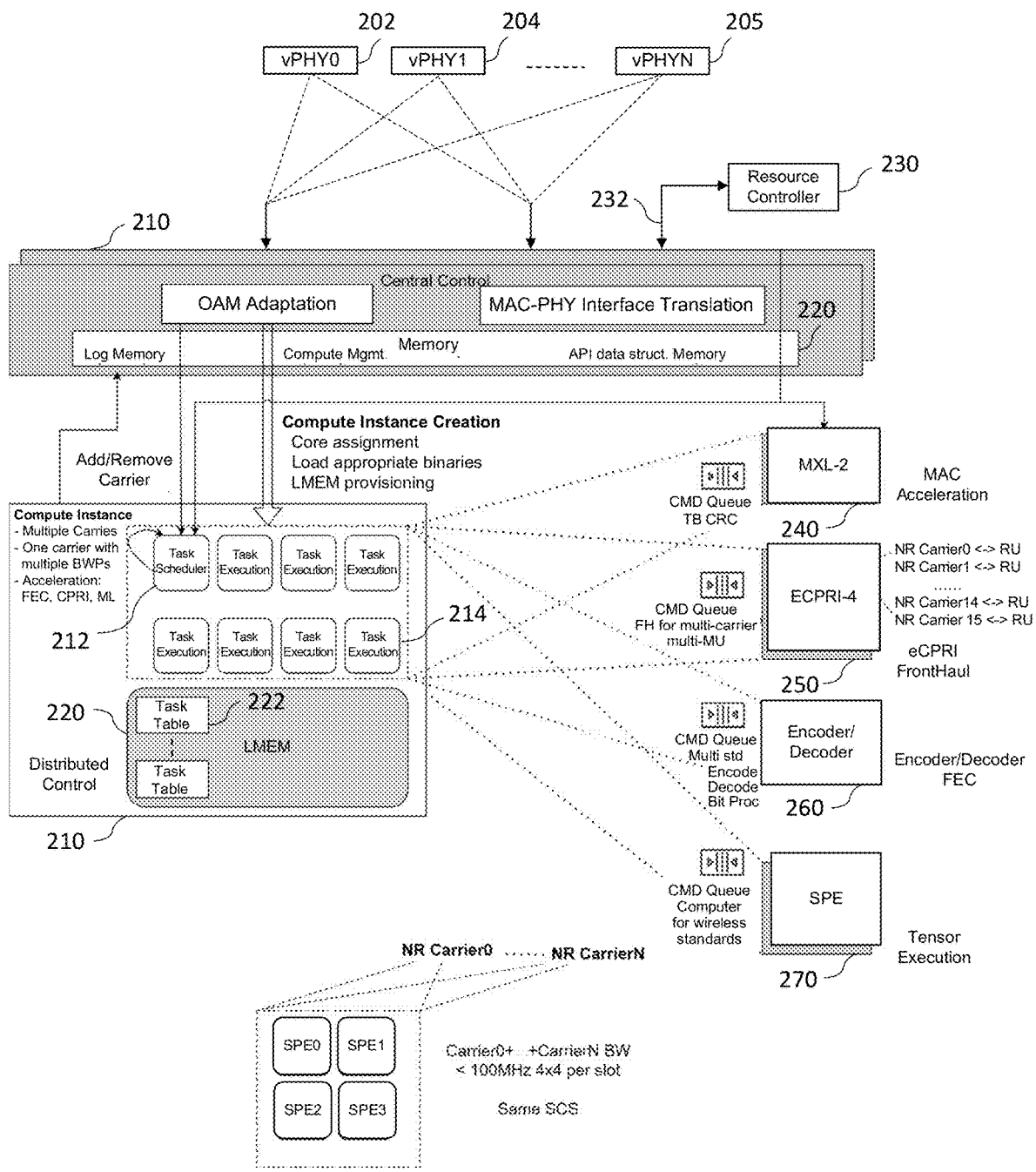
FIG. 2 depicts a central control unit for managing multiple wireless scheduling inputs across various applications, according to embodiments of the present disclosure.

FIG. 2 depicts a central control unit for managing multiple wireless scheduling inputs across various applications, according to embodiments of the present disclosure. The center processing unit 210 receives a plurality of wireless scheduling inputs for aggregated physical layer implementations. The center processing unit 210 comprises a plurality of configurable processing units, which are allocated to process the plurality of wireless scheduling inputs based at least on a resource control signal 232 output from a resource controller 230. In one or more embodiments, the center processing unit 210 and the resource controller 230 are integrated within a DU for real time L1 and L2 scheduling functions.

The plurality of wireless scheduling inputs may be scheduling requests on a physical layer in a virtualized setting, e.g., vPHY0 202, vPHY1 204, and vPHYN 205. The wireless scheduling inputs may be from the same DU or different DUs. In one or more embodiments, each wireless scheduling input may be defined as a type or a group that comprises one or more scheduling requests that are of the same or similar application type. Each scheduling input may have its own specific requirements or preference for operation parameters, e.g., latency, throughput, etc. For example, the scheduling input vPHY0 202 may comprise one or more scheduling requests to support one or more autonomous driving vehicles, while scheduling input vPHY1 204 may comprise one or more scheduling requests to service one or more IoT devices.

Upon receiving the plurality of wireless scheduling inputs, the center processing unit 210 adjustably allocates the plurality of configurable processing units to process the plurality of wireless scheduling inputs. The allocation may be based on at least one of: current status of the plurality of configurable processing units, one or more priority rules, and a resource control signal 232 output from a resource controller 230. In one or more embodiments, the center processing unit 210 may create a plurality of computation instances with each computation instance handling a wireless scheduling input. Each computation instance consumes a slice of overall hardware, software, or hardware and software resource (or at least resources on the physical layer) of the center processing unit 210. Each computation instance may be independently managed, controlled, and customized according to the specific requirement(s) of the corresponding wireless scheduling input. The one or more priority rules for resource allocation may comprise an instance priority rule to set priorities among different slices or computation instances, and/or a carrier priority rule for multiple carriers within a slice. Implementing one or more priority rules is important and valuable to allow scaling of very large number of scheduling inputs.

In one or more embodiments, the center processing unit 210 is a multi-core processing unit with a plurality of cores serving as configurable processing units for designated tasks. The center processing unit 210 may designate one or more cores 212 for task scheduling and the core(s) for task scheduling may function as shared resources among the plurality of computation instances. The center processing unit 210 may also assign one or more cores 214 dedicated to a computation instance for task execution. Shared resources may be determined every slot or subframe based on dedicated resources in that slot or subframe for each computation instance. The creation of a computation instance may involve at least one of: core assignment, load appropriate binaries, local memory (LMEM) provisioning, etc. A computation instance may be designated to handle multiple carriers or one carrier with multiple bandwidth parts (BWPs). A computation instance may be also specifically designated by tasks, e.g., acceleration for forward error correction (FEC), enhanced common public radio interface (eCRPI), or machine learning (ML).

The center processing unit 210 may comprise an LMEM 220 which stores one or more task tables 222 for core assignment. The task tables may be preloaded or dynamically established based at least on the plurality of wireless scheduling inputs received at the center processing unit 210. In one or more embodiments, the LMEM 220 may comprise memory allocations storing codes for computation management, application programming interface (API) data structure, and computation instance log records, etc.

During computation instance creation or execution, the center processing unit 210 may implement one or more operations comprising operations, administration and maintenance (OAM) adaptation, and/or MAC-PHY (or L2-L1) interface translation.

In one or more embodiments, a configurable processing unit in the center processing unit 210 is a core based on various architecture, e.g., ARM, x86, RISC-V, etc. architecture. Cores in the center processing unit 210 may be highly configurable for various tasks. One skilled in the art will recognize that various types of processing cores may be implemented across different embodiments of the invention.

Upon implementing the plurality of computation instances using respectively allocated resources, the center processing unit 210 generates one or more commands (CMDs), which are transmitted to one or more respectively hardware acceleration components for further processing. The one or more commands may comprise one or more commands to one or more medium access control accelerators (MXL) 240 for transport block (TB) processing, one or more enhanced common public radio interface (eCPRI) commands to control one or more eCPRIs 250, one or more forward error correction (FEC) commands to an encoder/decoder unit 260, one or more signal processing engine (SPE) commands to control a SPE 270. The SPE 270 may comprise a plurality of SPE units to implement channel estimation, measurements, equalization, etc.

Figure 3:
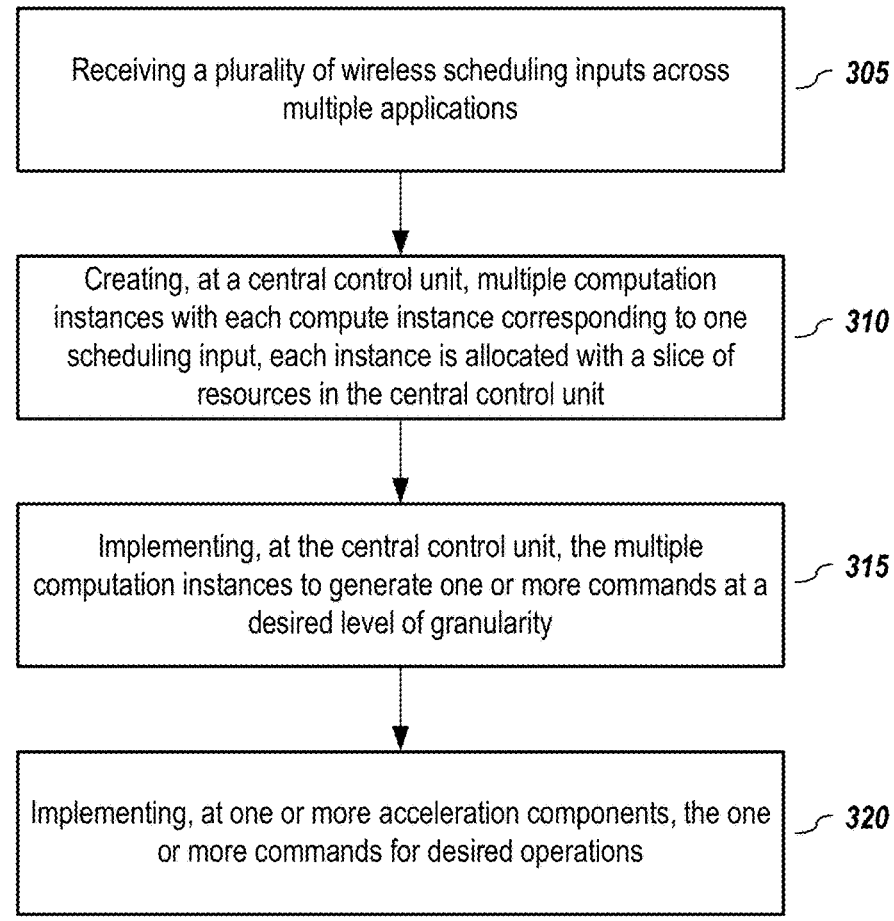
FIG. 3 depicts a process of allocating resources among multiple wireless scheduling inputs, according to embodiments of the present disclosure.

FIG. 3 depicts a process of allocating resources among multiple wireless scheduling inputs, according to embodiments of the present disclosure. In step 305, a central control unit, which resides within a DU, receives a plurality of wireless scheduling inputs across various applications, e.g., autonomous driving, IoT, etc. The central control unit comprises a plurality of configurable processing units which may be dynamically allocated for processing various tasks. In step 310, the central control unit creates multiple computation instances with each computation instance corresponding to one scheduling input. Each computation instance is allocated with a slice of resources in the central control unit. The slice assigned to an instance may comprise dedicated resources specific to the slice and shared resources among the multiple slices. Resource slicing at the central control unit may be based on at least one of current status of the plurality of configurable processing units, one or more priority rules, and a resource control signal output from a resource controller. In step 315, multiple computation instances are implemented to generate one or more commands at a desired level of granularity to control one or more hardware acceleration components. In step 320, the one or more hardware acceleration components respectively implement the one or more commands for desired operations.

C. Embodiments of PHY Policy Implementation

Upon receiving a plurality of scheduling inputs, the central control unit creates multiple computation instances by slicing resources into multiple slices to process the scheduling inputs. Resources to be sliced may comprise hardware, software, memory, or a combination thereof, and may be driven from core down to RAN. Resource slicing may be dynamically configured based on one or more priorities and policies. In one or more embodiments, resource slicing may involve resource allocation among different scheduling inputs, and also among various carries within the same scheduling input. For example, one of the multiple scheduling inputs may be related to automatous driving service for multiple automatous vehicles. The central control unit needs to be implement resource allocation not only between automatous driving services and other types of scheduling inputs, but also among the multiple automatous vehicles.

Figure 4:
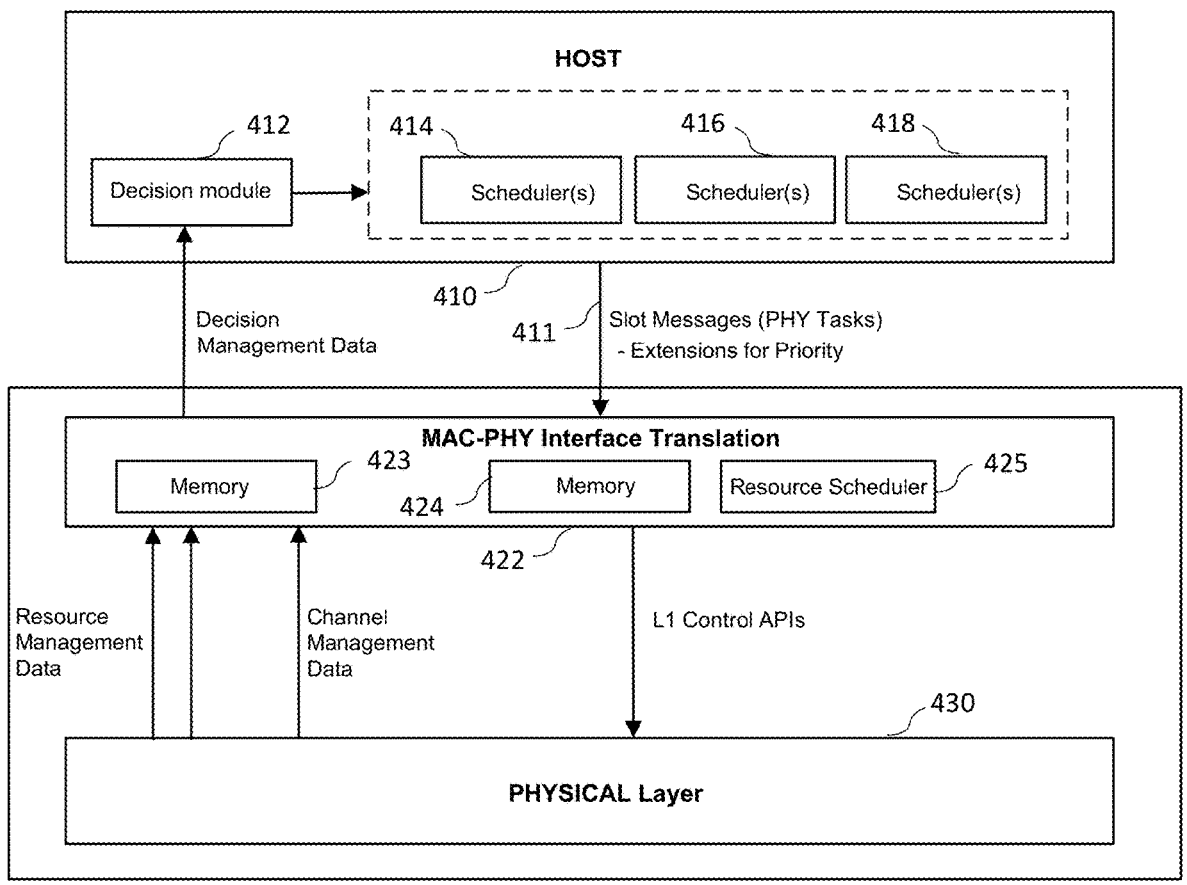
FIG. 4 depicts a schematic diagram for PHY policy implementation, according to embodiments of the present disclosure.

In certain situations, a central control unit, such as a single large-core host, may receive excessive scheduling inputs which are challenging to be served for PHY implementation in a constrained time bound. Accordingly, an efficient and dynamic PHY policy implementation may be necessary. FIG. 4 depicts a schematic diagram for PHY policy implementation, according to embodiments of the present disclosure. As shown in FIG. 4, the central control unit 410 is a single large-core host comprising multiple configurable processing units 414, 416, and 418, etc., which may be single cores configurable for implementing various scheduling tasks. The central control unit 410 may also comprise a decision module 412 coupled to control the multiple configurable processing units for desired slice or computation instance allocation. The decision module 412 may be a core (e.g., the core 212 shown in FIG. 2) specifically designated for task scheduling among other cores within the central control unit 410. The decision module 412 receives decision management data 426 resulting from a MAC-PHY interface translation operation 422, which may at least involve codes or firmware loaded within a memory 423 allocated for computation management, API data structure information within a memory 424 allocated for API data structure storage, and a resource scheduling control signal output from a resource scheduler 425. The slot message 411 to be processed in the MAC-PHY interface translation operation may comprise slot/PHY tasks messages related to multiple scheduling inputs (e.g., vPHY0, vPHY1, vPHYN shown in FIG. 2) and may also comprise extensions for priority among the PHY tasks.

In one or more embodiments, the memory 423 allocated for computation management is loaded with management information of the physical layer 430, such that situation of the physical layer 430 may be taken into consideration during the MAC-PHY interface translation operation 422. The management information may comprise resource management data, and channel management data, etc.

D. Embodiments of PHY Tasks Migration

In certain situations, a host may receive excessive scheduling inputs. As a result, the configurable processing units in the host may be over-provisioned. When this happens, the host or the resource scheduler may implement dynamic resource allocation such that the configurable processing units are not synchronized for increased PHY scheduling capacity to meet the needs. If such an asynchronous operation is not adequate or a specific criteria is met, e.g., one or more quality of service (QoS) parameters (latency, throughput, error rate, etc.) reaching a threshold, the host or the resource scheduler may need to migrate one or more currently served scheduling inputs to another distribution unit (DU), preferably without causing service interruption to end-users.

Figure 5A:
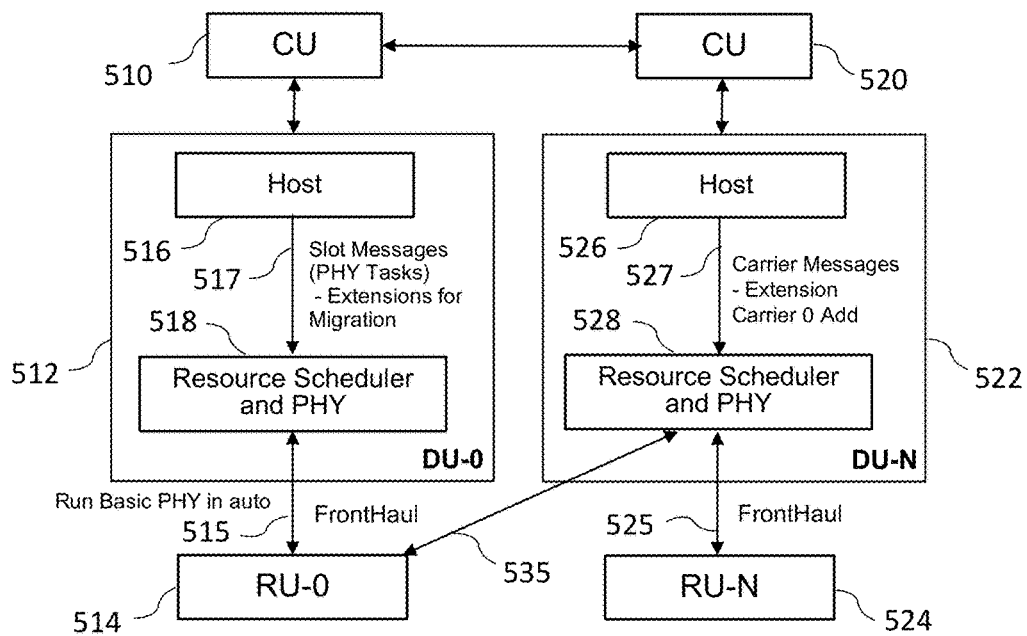
FIG. 5A depicts a diagram of tasks migration for one or more wireless scheduling inputs, according to embodiments of the present disclosure.

FIG. 5A depicts a diagram of tasks migration for one or more wireless scheduling inputs, according to embodiments of the present disclosure. As shown in FIG. 5A, a first host (or a first central control unit) 516 and a first resource scheduler and PHY 518 both reside within a first DU 512, which coupes to a first control unit (CU) 510. The first DU 512 couples to a first radio unit (RU) 514 via a first fronthaul link 515. A second host (or a second central control unit) 526 and a second resource scheduler and PHY 528 both reside within a second DU 522, which coupes to a second CU 520. The second DU 522 couples to a second RU 524 via a second fronthaul link 525.

Figure 5B:
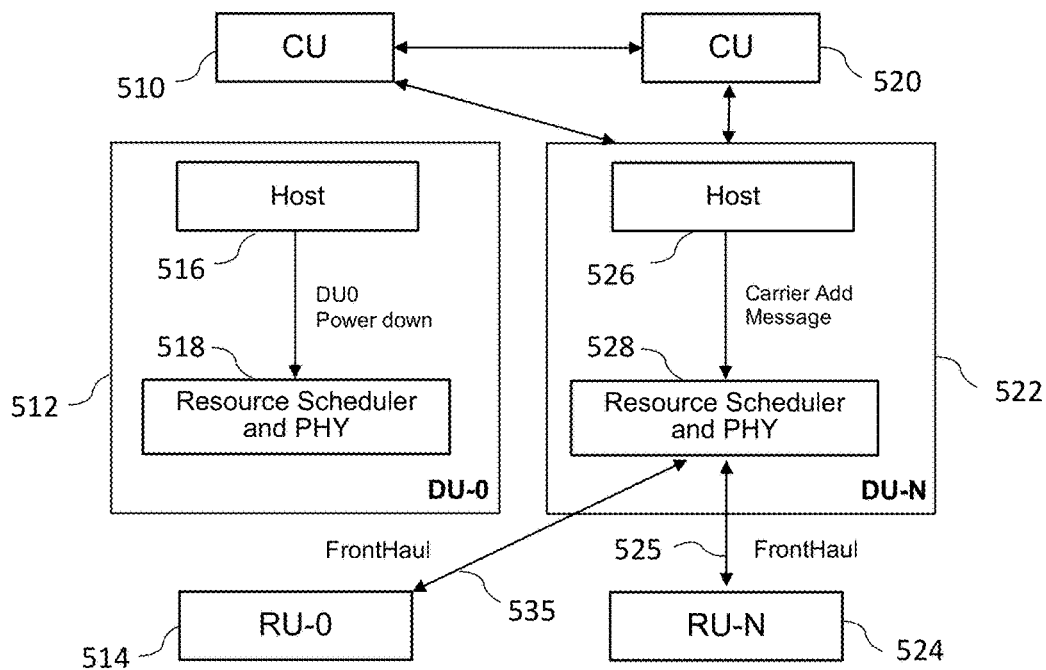
FIG. 5B depicts a diagram of full migration for wireless scheduling inputs, according to embodiments of the present disclosure.

PHY scheduling migration may be initiated by the first host 516, the first resource scheduler 518, or the first CU 510. When scheduling inputs from the first RU 514 are excessive (e.g., at least one QoS parameter reaching a threshold, or one of the slices of resources reaching a minimum resource threshold), the first host 516 sends a slot message 517 comprising extensions of one or more PHY tasks for migration to the first resource scheduler and PHY 518. The selection of the PHY tasks for migration may be based on one or more instance priority rules to set priorities among different slices or computation instances, and/or one or more carrier priority rules for multiple carriers within a slice. The first resource scheduler and PHY 518 communicates to the first RU 515 such that the first RU 515 transmits scheduling inputs associated with the one or more PHY tasks for migration to the second resource scheduler and PHY 528 via a third fronthaul link 535, besides to the first resource scheduler and PHY 518 via a first fronthaul link 515. The second host 526 sends a carrier message 527 comprising extensions to add the one or more PHY tasks for resource allocation to the second resource scheduler and PHY 528. Once the second resource scheduler and PHY 528 allocates resources for the one or more PHY tasks, the first RU 514 stops transmitting scheduling request for the one or more PHY tasks to the first DU 512. Such a make-before-break approach ensures no service interruption to end users. In certain situations, the first DU 512 may even have power down and migrate all PHY tasks to the second DU 522, as shown in FIG. 5B.

Figure 6:
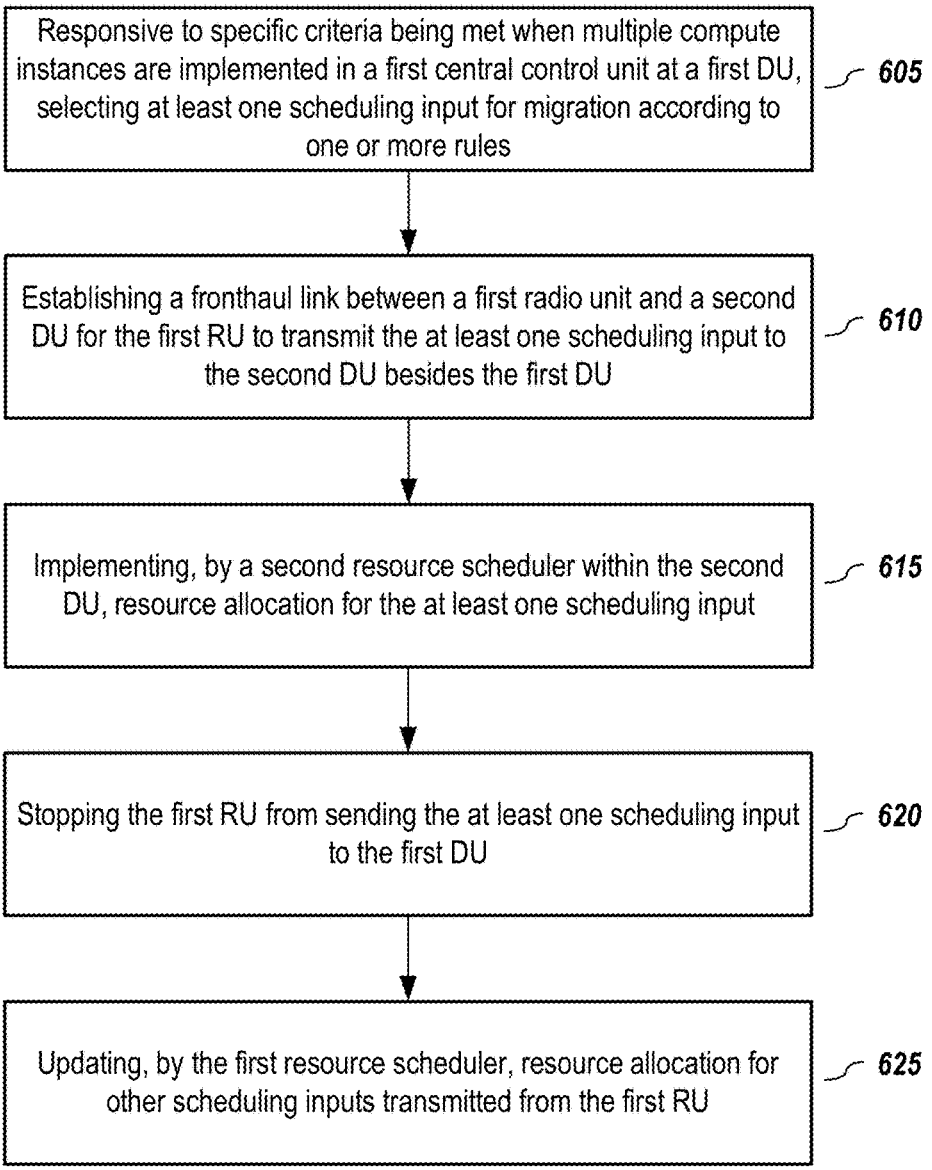
FIG. 6 depicts a process of wireless scheduling migration, according to embodiments of the present disclosure.

FIG. 6 depicts a process of wireless scheduling migration, according to embodiments of the present disclosure. In step 605, responsive to specific criteria being met when multiple compute instances are implemented in a first central control unit at a first DU corresponding to one or more scheduling inputs from a first RU, the first central control unit selects at least one scheduling input for migration according to one or more rules. The one or more rules may comprise on one or more instance priority rules to set priorities among different slices or computation instances, and/or one or more carrier priority rules for multiple carriers within a slice. In step 610, a fronthaul link between a first radio unit and a second DU is established for the first RU to transmit the at least one scheduling input to the second DU besides the first DU. In step 615, a second resource scheduler within the second DU implements resource allocation in a second host for the at least one scheduling input. In step 625, the first resource scheduler updates resource allocation for other scheduling inputs transmitted from the first RU.

Embodiments of PHY tasks migration may enable seamlessly adding or removing a computation instance or a slice of resources. Additionally, prioritization may be implemented for existing slices when overloading happens, such that slices with higher priority may be allocated with more resources for more aggressive implementation. The make-before-break migration approach as shown in FIG. 5A allows non interruption for end users during scheduling migration, thus increases robustness for the communication service.

Figure 7:
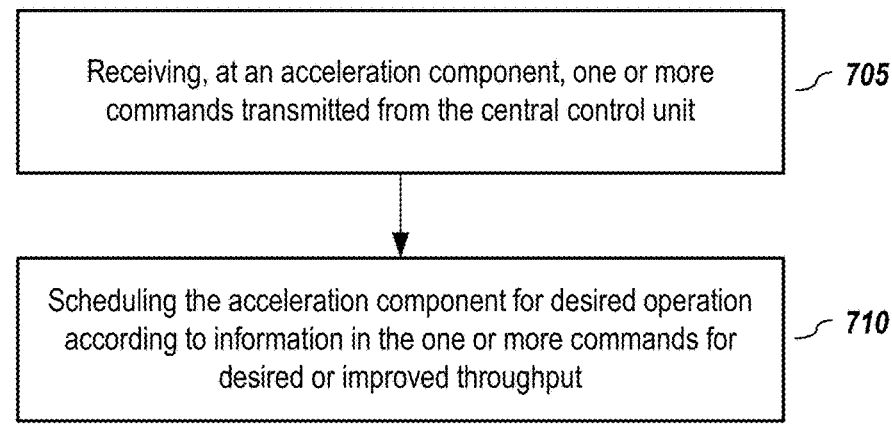
FIG. 7 depicts a process of local control of resource allocation, according to embodiments of the present disclosure.

FIG. 7 depicts a process of local control of resource allocation, according to embodiments of the present disclosure. In step 705, an acceleration component receives one or more commands transmitted from the central control unit. The acceleration component may be a hardware acceleration component, a software acceleration component, or a combination thereof. For example, the acceleration component may be an encoder/decoder unit, a signal processing engine, an eCPRI, etc. In step 710, a local control firmware schedules the hardware acceleration component for desired operation according to information in the one or more commands for desired or improved throughput.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for resource allocation across wireless communication applications comprising:
    receiving, at a central control unit within a distribution unit (DU), a plurality of wireless scheduling inputs across multiple wireless communication applications, the central control unit comprises multiple configurable processing units;
    creating, at the central control unit, multiple computation instances with each compute instance corresponding to one scheduling input, each computation instance is allocated with a slice of resources in the central control unit;
    implementing, at the central control unit, the multiple computation instances to generate one or more commands at a desired level of granularity; and
    implementing, at one or more acceleration components, the one or more commands for desired operations.

2. The method of claim 1 wherein the multiple wireless communication applications comprise at least two of 5G applications, each wireless scheduling input associates to one or more scheduling requests of the same or similar application type.

3. The method of claim 1 wherein allocation of resources for each of the multiple computation instances involves at least one of core assignment, load appropriate binaries, and local memory (LMEM) provisioning.

4. The method of claim 1 wherein the multiple computation instances are specifically designated by tasks for acceleration for forward error correction (FEC), common public radio interface (CRPI), MAC acceleration, signal processing engines, or machine learning (ML).

5. The method of claim 1 further comprising:
    selecting at least one scheduling input for migration according to one or more rules responsive to a specific criteria being met when one or more compute instances are implemented; and
    migrating the at least one scheduling input to another DU without service interruption.

6. The method of claim 5 wherein the one or more rules comprise on one or more instance priority rules to set priorities among different computation instances, one or more carrier priority rules for multiple carriers within one computation instances, or a combination thereof.

7. The method of claim 1 wherein each slice of resources comprises dedicated resources specific to the each slice and shared resources among multiple slices, the shared resources are determined every slot or subframe based on dedicated resources in that slot or subframe for each computation instance.

8. The method of claim 1 wherein the central control unit is a multi-core host comprising multiple cores configurable for implementing various scheduling tasks, and a decision module specifically designated for task scheduling for the multiple cores, the decision module receives decision management data resulting from a MAC-PHY interface translation for task scheduling.

9. The method of claim 8 wherein the MAC-PHY interface translation involves codes or firmware loaded within a memory allocated for computation management, application programming interface (API) data structure information within a memory allocated for API data structure storage, and a resource scheduling control signal output from a resource scheduler.

10. A system for resource allocation across wireless communication applications comprising:
    a resource controller generating a resource control signal for resource allocation for a plurality of wireless scheduling inputs across wireless communication applications;
    a host comprising multiple configurable processing units, the host creates multiple computation instances base at least on the resource control signal with each compute instance corresponding to one scheduling input, each computation instance is allocated with a slice of resources in the host, the multiple computation instances are implemented to generate one or more commands at a desired level of granularity.

11. The system of claim 10 wherein the resource scheduler and the host are integrated within a distribution unit (DU).

12. The system of claim 10 wherein each slice of resources comprises dedicated resources specific to the each slice and shared resources among multiple slices, the shared resources are determined every slot or subframe based on dedicated resources in that slot or subframe for each computation instance.

13. The system of claim 10 wherein the host comprises a decision module specifically designated for task scheduling for the multiple configurable processing units, the decision module receives decision management data resulting from a MAC-PHY interface translation for task scheduling.

14. The system of claim 13 wherein the MAC-PHY interface translation involves codes or firmware loaded within a memory allocated for computation management, application programming interface (API) data structure information within a memory allocated for API data structure storage, and a resource scheduling control signal output from a resource scheduler.

15. The system of claim 11 wherein the host selects at least one scheduling input for migration to another DU according to one or more rules responsive to a specific criteria being met when one or more compute instances are implemented, the at least one scheduling input is migrated to another DU without service interruption.

16. A method for resource allocation across wireless communication applications comprising:

implementing, at a first host within a first distribution unit (DU), multiple computation instances to process a plurality of wireless scheduling inputs across multiple wireless communication applications from a first radio unit (RU), the first host comprises multiple configurable processing units, the multiple computation instances are created based at least on a resource control signal from a first resource controller within the first DU, each compute instance corresponds to one scheduling input, each computation instance is allocated with a slice of resources in the first host;

responsive to a specific criteria being met when the multiple computation instances are implemented, selecting at least one scheduling input for migration according to one or more rules;

establishing a fronthaul link between a first RU and a second DU for the first RU to transmit the at least one scheduling input to the second DU besides to the first DU;

implementing, by a second resource scheduler within the second DU, resource allocation for the at least one scheduling input; and stopping the first RU from sending the at least one scheduling input to the first DU.

17. The method of claim 16 further comprising:

updating, by the first resource scheduler, resource allocation for other scheduling inputs transmitted from the first RU.

18. The method of claim 16 wherein the one or more rules for selecting the at least one scheduling input comprises on one or more instance priority rules to set priorities among the multiple computation instances, or one or more carrier priority rules for multiple carriers within a computation instance.

19. The method of claim 16 wherein upon selecting at least one scheduling input, the first host sends a slot message comprising extensions of one or more PHY tasks for migration to the first resource scheduler.

20. The method of claim 16 wherein upon the second resource scheduler implementing resource allocation for the at least one scheduling input, a second host within the second DU sends a carrier message comprising extensions to add the one or more PHY tasks for resource allocation to the second resource scheduler.

\* \* \* \* \*